Patented Nov. 14, 1922.

1,435,593

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

PRODUCING POTASSIUM COMPOUNDS.

No Drawing.  Application filed October 18, 1918. Serial No. 258,719.

*To all whom it may concern:*

Be it known that I, CARLETON ELLIS, a citizen of the United States, and a resident of Montclair, in the county of Essex and State of New Jersey, have invented certain new and useful Improvements in Producing Potassium Compounds, of which the following is a specification.

This invention relates to a process of making potassium salts or compounds, preferably with the production of cement or material which is capable of subsequent treatment to become converted into a hydraulic cement, including slags and the like which may be suitably treated to yield cementitious material and the process involves the heat treatment of mixtures of raw materials such as minerals, fuel and so forth containing potash in a substantially unavailable and unconcentrated form, whereby the potash material is expelled or fumed off in a substantially available form or as a concentrate of utility; as for example, a product containing a sufficient amount of potassium compounds to be capable of use directly as a fertilizer or ingredient of fertilizers.

The present invention involves in one form at least the treatment of silicates or similar mineral material containing from traces to substantial amounts of potash ($K_2O$) ordinarily united in the silicate in such a manner as to be substantially unavailable for example, as a fertilizing material. For instance, orthosilicates, including algerite, hauyhite, kaliophilite, microsommite, nephelite, and leucite; or polysilicates such as anorthoclase, hyalophane, microcline and orthoclase may be used. Various hydrous silicates as for example, biotite or black mica, lepidomelane, lepidolite, muscovite, phlogopite and several zeolites carrying potassium in various amounts or potassiferous glass resulting from the weathering of certain of these silicates may be utilized.

The present invention involves primarily the production of a fusible body or slag from such potassiferous silicates and for this purpose the silicious material may be mixed with lime or other fluxing material and is then heated, preferably in a chamber in contact with fuel undergoing combustion and in the presence of a strong current of air, or air containing products of combustion which by passing through the fused mass serves to distill or fume off the potassium compounds in an effective manner. If the slag product is intended to be used as a cement it is desirable to eliminate the potassium from the slag as much as possible. The presence in the final fused product of as much as 1% of potash ($K_2O$) is undesirable. Ordinarily it is not easy to fume off potassium compounds from the mineral to reduce the content of potash to below 1% where the percentage of the alkali has been substantially higher at the start of the operation. The passage of a current of air, especially if the latter is preheated, through a molten mass containing the potassium compounds causes the latter to be constantly volatilized and removed from the place of the reaction and thereby greatly facilitates the removal of the potash down to a point where the slag may be usefully employed as a cement of desirable qualities.

In order to assist in volatilizing the potassium it is also possible to introduce a chloride such as calcium or magnesium chloride or common salt. The chlorine of these compounds is transferred to some extent at least to the potassium, and potassium chloride is obtained which is somewhat more volatile than most of the other forms of potassium compounds. Similarly zinc or barium chloride may be employed. While the sulphate of potassium is more difficult to volatilize, and this holds true also of the phosphate and carbonate, under the conditions of fusion which obtain in the present invention, the potassium sulfate if present, or formed during the reaction, may be readily expelled. The rate or degree of volatilization hinges on a number of conditions among which are the nature of the original silicate, the temperature employed, the amount of calcium chloride or other chloride present, if any be added, the rate of flow of air through the molten mass, the degree of preheating of the air, if preheating is employed, the depth of the fused material, the degree of agitation and effectiveness of this agitation produced by the passage of the air through the molten material or material which is undergoing fusion, the nature of the products of combustion whether oxidizing or reducing, and the effect of carbon dioxide and carbon monoxide.

Besides the use of calcium chloride or other chloride as fluxes or for the purpose of furnishing chlorine to unite with the potash, other bodies may be employed in a similar manner such as fluospar or cryolite.

When the silicate material or raw mix contains iron compounds the use of calcium chloride or similar chloride may also tend to cause some volatilization of the iron present. This is useful, in the production of a white cement but not desirable in making an iron-containing cement or when the iron is to be retained for other reasons.

If the removal of the potassium chlorides, fluorides, and other fluxes by volatilization tends to reduce the melting point of the material too greatly this should be compensated by the addition of a sufficient amount of fluxing material such as cryolite or fluorspar which may be added gradually during the volatilization stage so as to reduce the fusing point in a gradual way, or in other words so as to prevent the fusing point from rising too rapidly. The use of cryolite or fluorspar or any similar flux gradually added in this manner constitutes one modification of the present invention.

For example a mixture of feldspar and calcium chloride together with a small proportion of calcareous material and fluxes may be melted in a furnace of the regenerative type. Potassium in the form of carbonate or chloride may be added in small amount to secure a rapid fusion. The mixture is raised to the volatilizing temperature and the potassium compounds are removed in the current of air or products of combustion passing over the molten surface. The volatilization of the potassium compounds may be facilitated by blowing air through the liquid material by means of air inlets situated in the bottom of the hearth. To convert the fused material or slag into a cementitious product this may be carried out by adding lime and increasing the temperature if necessary to maintain the slag in a molten condition. If desired the molten product may be comminuted by means of a jet of water or steam. By using an open hearth furnace or similar furnace the molten material is maintained in the form of a relatively thin layer from which the potassium compounds are readily expelled and in consequence the length of time required for this operation is correspondingly short.

The advantages of a constantly renewed gaseous atmosphere in the volatilizing zone of the fusion is of great importance. While it is possible with very thin layers of molten material, for example, a layer only two or three inches thick it may be feasible to eliminate the potassium compounds without passage through the layer of superheated steam, air, products of combustion and the like, when the layer is maintained six inches to a foot or more in depth the use of such vapors or gases constitutes a useful means of withdrawing the potassium compounds.

In place of using coal, oil, or combustible gas and the like as a fuel, the heating chamber employed in the present invention may be electrically heated as by means of resistance elements or the charge in the furnace may contain a sufficient amount of coke to serve as a resistor itself. In this case it is possible instead of using air alone to use air admixed with products of combustion which are introduced into the furnace preferably in a preheated condition. Or inert gases incapable of supporting combustion may be employed. Thus the furnace may be heated entirely by electric means or by electric means aided by combustion of some amount of fuel.

In the preferred form of the invention operating with fused materials it is an object to produce potassium sulfate or carbonate, rather than the chloride or to produce a mixture in which the former compounds predominate. For fertilizing purposes the sulphate is preferred to the chloride and in some cases the carbonate is especially desired. The sulphate may be formed by reaction of the potassium compounds present with the sulphur dioxide and trioxide formed by combustion of sulphur in the coal or coke. The carbonate may be formed direct from the oxide when potash is liberated in that form, on coming in contact with the carbon dioxide of the products of combustion. As both the sulphate and carbonate are relatively difficult to volatilize, as stated, it is important to arrange the chamber in which the volatilization goes on, in such a manner that no undue waste of fuel occurs through sublimation and deposition in the colder parts of the furnace or on the colder parts of the entering charge, as the potassium compounds thus deposited passing down into the mass beneath to have to be re-volatilized at the expense of fuel and thus the capacity of the furnace is correspondingly reduced. It is desirable to have the outlets for the fumes and products of combustion at a point somewhat below the point where the raw material is charged, thus giving the latter the opportunity to become heated to a sufficient degree so that when the potassium containing fumes come in contact therewith there will not be any objectionable deposition but the fumes will be carried along freely by the gases to the point where they are to be collected.

In the volatilization of a body such as potassium chloride, for example, the vapors or fumes often appear as a difficultly-condensible portion and an easily-condensible portion. The latter is liable to deposit on the walls of the heating chamber unless properly suspended in the gaseous current. The difficultly-condensible portion is a source of considerable trouble to completely collect in the washing apparatus. On the other hand it is desirable to give the fumes an opportunity to remain under heating conditions sufficiently long so that the minute particles will collect and agglomerate more or less to form larger particles which are easily condensible yet not sufficiently so as to deposit to an objectionable extent in the fusion kiln.

In a kiln of the shaft type the cold material may be charged in at the top and as this travels toward the lower end the temperature increases and a point is reached where volatilization of the potassium sulphate, carbonate, phosphate, chloride or other potassium compounds begins. This may occur to some slight extent even below red heat in some cases but effective volatilization of compounds like the sulphate or carbonate takes place at a considerably higher temperature. As the temperature and nature of the gases coming in contact with the material may have a marked influence on the rate of volatilization care should be taken that the flow of gases through the mix is rapid and that the melted portion of the mix is maintained in motion. By having the outlet for the products of combustion and fumes situated somewhat below the top of the cold entering charge the potassium salts may be removed readily, subsequently to be deposited as a sublimate or dust in a dust-collecting chamber or taken up in wash waters in scrubbing apparatus. The sublimate or dust may, if desired be leached to produce a purer product. Obtained as a dust it may be used directly for agricultural purposes and when lime is present this is often useful as serving to correct the acidity of soils of an acid nature. The difficultly-condensible portion of the volatilized salt may be caught by means of a water spray and taken to an evaporating pan where the water may be removed. The gases with their residual potassiferous fume or vapor may be passed through a series of sprays until the total potassium content is removed. Or electric precipitation may be employed in whole or in part to collect the potassiferous material. A sublimate or dust containing at least 15 to 20% or so of potassium compounds may thus be collected and this may be used directly as a potash fertilizing agent without the necessity of resorting to leaching or further concentration.

In carrying out the present process a furnace of the cupola type may be employed, for example one shaped like a blast furnace, equipped with tuyeres, a charging hopper and an outlet for the molten material. In the upper part of the furnace are one or more outlets for gases and for the potassiferous sublimate and fumes. Means are provided for collecting the sublimate and fumes and preferably in a successive manner by first collecting the heavier potassiferous material along with dust and the like and in subsequently recovering the potassium compounds which exist in the fume form. Preferably the outlets for the gases and potassiferous fumes should be situated some distance below the charging hopper in order that the cold entering charge may become heated somewhat before the fumes come in contact therewith. In carrying out the process with this apparatus a charge of raw material in the lump form, together with coke is introduced through the charging hopper, the fuel ignited and the charge melted. The charge of raw material may be of a character suited for cement making as aforesaid or may be any other suitable silicious or calcareous material containing more or less potash. Air, preferably preheated, is forced into the furnace through the tuyeres. The gaseous current passes into the collecting chambers where the potassiferous material is removed by successive extraction, washing or other means of collection. The readily condensible potassium-containing material is recovered in the first collecting chamber while the fume is collected in the subsequent chambers. The melt freed or largely freed from potassium compounds is run off at the side-outlet and may be reduced at this point to a comminuted state by atomizing jets blowing steam or water on the emerging stream of slag. The slag material obtained may be subsequently ground with lime or hydrated lime or otherwise treated to improve its hydraulic qualities. It is a feature of the invention to carry on the operation to reduce the charge to a potash content below 1% and preferably conditions are maintained to this end, it being desirable to space the outlets for the gases and potassiferous fumes a substantial distance below the point where the cold raw material enters the furnace, as stated, in order to reduce the amount of deposition of the volatilized potassium salts on the cold incoming charge. As the conditions of the furnace are preferably maintained reducing, there may be obtained from the raw charge various metallic bodies which in some cases, such as iron, may be recovered as molten metal at the bottom of the furnace.

In some cases the furnace may be of an openhearth type such as an ordinary regenerative open-hearth furnace having gas and air ports or flues. The material is fed into this furnace and the slag withdrawn as required. The potassiferous fumes and vapors are carried out with the gases and the two components, namely the readily separable potassiferous material and the peculiar non-condensible portion are subsequently treated by stages of collection or separation as indicated. In some cases the same chamber may be employed to collect both portions, the heavier portion being separated by gravity or simple cooling or sublimation, and the portion called the non-condensible part may be otherwise treated as by washing or other suitable collecting or depositing means to recover this part of the potassiferous fumes.

So far as I am advised, prior to my investigation of this subject and the filing of Serial No. 633,926, filed June 19, 1911, of which this application is a continuation in part, it was not known that when potassiferous compounds are liberated from minerals by heat treatment with the object in view of producing potassium compounds on the large scale for use in fertilizers and the like, that the potassium would be liberated in two forms, namely an easily-condensible portion, sublimate or dust and a difficultly-condensible fume or vapor or form of potassium compound in some peculiar physical or chemical state as to not readily condense. While the easily-condensible portion is likely to deposit in the kiln or furnace and be constantly carried back into the charge with the likelihood of failure of complete or fairly complete expulsion; on the other hand potassiferous fumes in peculiar non-condensible state call for very energetic collecting means. This observation of mine which constitutes a feature of this invention takes into account the two kinds of potassiferous fumes or volatilized material and the invention comprises the method of collection of such diverse potassiferous products.

While the invention has been specifically described with reference to a cupola type of furnace another form thereof is that illustratively described in Serial No. 633,926, and embraces in one illustrative form a cement kiln or series of rotary kilns through which the raw material is moved in contact with a heating flame and the potassium is recovered successively in different chambers as for example in the different housings of the heating sections employed when more than one is used or when a single kiln is employed, for example, the potassiferous material of this duplex character, that is to say consisting of an easily-condensible and difficultly-condensible portion may be collected in the following manner, the dust and easily-condensible material is collected in a large housing or settling chamber or dust chamber and the remaining potassiferous material of a substantially difficultly-condensible nature may be collected by separating from the gases in which the fume is carried or by other suitable devices for retaining such difficultly-condensible product. The terms "easily-condensible" and "difficultly-condensible" as used herein do not necessarily mean that the potassium compounds are condensed from a vapor to a solid state but that the potassiferous material occurs in two substantially different forms or phases, one part of which is easily separable and the other which is decidedly difficult to separate and requires drastic treatment for the purpose.

The waste heat from the furnaces may be employed to evaporate the solutions of potassium compounds obtained by leaching, washing, scrubbing, separating etc. of the crude potassiferous material obtained by the furnace treatment.

While I am unable to state in just what condition the potassium exists when in the difficultly-condensible form, I believe it to be a phenomenon akin to that observed in the sulphuric acid industry in the manufacture of fuming sulphuric acid. It has been observed that sulphur trioxide may require a form in which it will pass through ordinary sulphuric acid without being absorbed and requires acid of about 98–100% strength to collect it properly. This condition has been ascribed to a static or electrified phase rendering the acid resistant to absorbing means. That when sublimed from rock, there should be produced two forms of the potassium as stated, is unexpected and could not have been predicted. My experiments showed me, however, that potassium appeared in this duplex form and that it was necessary to establish conditions such that recovery of the potassium in both forms could be carried out on a commercial scale. The difficultly-condensible form may be termed "collodial potash" or "collodial potassium salts" and its collection may involve a plurality of separating means for example, after removing the readily-condensible portion of the volatilized potassium compounds together with more or less finely-divided mineral matter which has been taken up by the gases the latter may be subjected to washing or scrubbing with water to remove a portion of the difficultly-condensible or colloidal potassium compounds and after cooling has been effected by such treatment the gases may be subjected to electrical precipitation means to substantially remove the remainder of the colloidal potassium compounds.

A composition suitable for liberating potassium compounds may be prepared by mixing silicate rock containing leucite in the proportion of 100 parts by weight with approximately 150 parts of lime stone and an adequate quantity of coke for heating purposes. These materials in the lump form are charged into the cupola furnace as aforesaid and brought to the fusion temperature and the potassiferous fumes volatilized or distilled off and collected progressively according to their physical and chemical constitution as aforesaid. The melt preferably is heated until less than 1% of potash remains therein.

What I claim is:—

1. The process of producing potassium compounds which comprises charging into a chamber, fuel and a fusible raw mix containing silica, alumina and lime in such proportions as to yield hydraulic cement, such mixture carrying potassium in a substantially unavailable form, igniting the fuel thereby raising the temperature of the raw mix and eventually converting it to a completely molten state, forcing air through the mix to burn the fuel and to carry off fumes containing available potassium compounds and withdrawing the fumes without substantial condensation or sublimation on the colder parts of the chamber or cold entering charge.

2. The process of producing potassium salts which comprises charging into a chamber, solid fuel and a fusible raw mix containing silica and lime and containing potassium compounds in a substantially unavailable form, igniting the fuel and thereby raising the temperature of the raw mix and eventually converting it to a molten state, forcing preheated air through the mix to burn the fuel and carry off fumes containing available potassium compounds, withdrawing the fumes without substantial condensation or sublimation on the colder parts of the chamber or cold entering charge, and separating the potassium content of the fumes into an easily-condensible and a difficultly-condensible portion.

3. The process of producing salts which comprises charging into a chamber fuel and a fusible raw mix containing silica and lime and carrying potassium in a substantially unavailable form and containing a chlorid, igniting the fuel and thereby raising the temperature of the raw mix and eventually converting it into a molten state, forcing preheated air through the mix to carry off fumes containing available potassium compounds, withdrawing the fumes without substantial condensation or sublimation on the colder parts of the chamber or cold entering charge, and collecting a concentrate containing at least 15% potash.

4. In the process of producing salts the improvement which comprises heating to complete fusion, a charge of raw material containing substantially unavailable potassium compounds and a chloride whereby a substantial part of the potassium content is volatilized to form a fume containing readily-depositing and difficultly-depositing potassium compound bodies and separately collecting these two forms of potassiferous material.

5. In the process of producing available potassiferous material by completely fusing rock material containing substantially unavailable potassium compounds the step which comprises throwing down easily-condensible vaporized potassiferous bodies and subsequently subjecting the remaining gases and fumes containing potassiferous bodies which are of a difficultly-condensible character to more drastic collecting conditions whereby a substantial portion of the difficultly condensible part of the fumes is recovered.

6. The process of treating mineral silicates containing potassium for the recovery of potassium compounds therefrom which comprises mixing said silicates with lime material, completely melting such mixture in contact with solid fuel and an air blast, passing hot gases in contact with the silicate and lime material, said gases being at a sufficient temperature to cause volatilization of potassium compounds and to produce two forms of said compounds, namely an easily-condensible or separable form and a difficultly-condensible or colloidal form, drawing off the gases from such operation together with the duplex potassium material and finely-divided mineral matter taken up by the gases, and subjecting the gases to a plurality of separating actions to first separate the easily-condensible potassium compounds together with the major portion of said finely-divided mineral matter and to subsequently separate the "colloidal" material.

CARLETON ELLIS.